(No Model.)
J. MITCHELL.
SEED PLANTER.
No. 401,897. Patented Apr. 23, 1889.
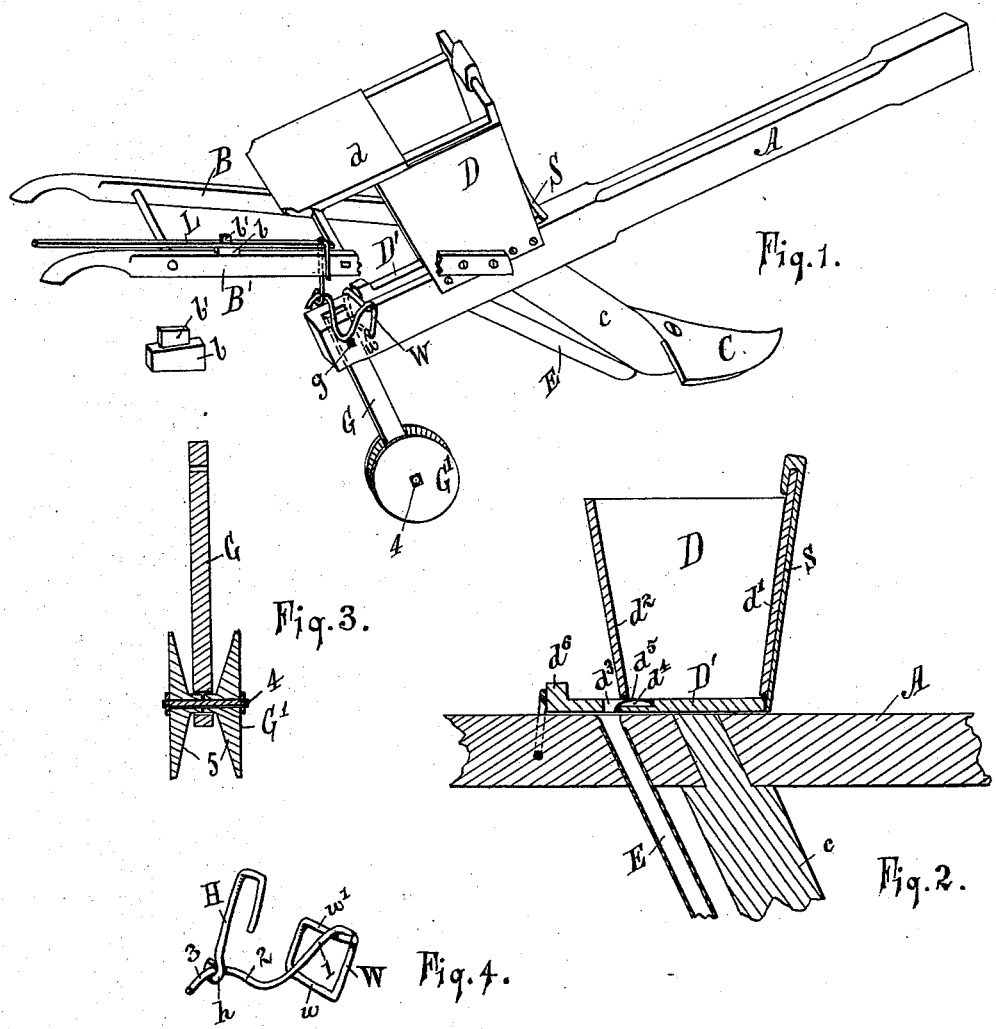
Witnesses:
Edw. E. Clement
Saml. H. Jacobson
Inventor:
Jack Mitchell
by Lewis Abraham
Attorney

UNITED STATES PATENT OFFICE.

JACK MITCHELL, OF DEFOE, KENTUCKY, ASSIGNOR OF ONE-HALF TO ALBERT W. DREYFOOS, OF SAME PLACE.

SEED-PLANTER.

SPECIFICATION forming part of Letters Patent No. 401,897, dated April 23, 1889.

Application filed November 2, 1888. Serial No. 289,850. (No model.)

*To all whom it may concern:*

Be it known that I, JACK MITCHELL, a citizen of the United States, residing at Defoe, in the county of Henry and State of Kentucky, have invented a new and useful Improvement in Seeders and Planters, of which the following is a specification.

My invention relates to seeders and planters of that class wherein a given quantity of seed is intermittently dropped within a furrow made by a plowshare depending from the plow-beam, and which is then covered by means of a follower, as hereinafter fully described, illustrated in the drawings, and specifically pointed out in the claims.

Referring to the accompanying drawings, wherein like letters of reference point out similar parts on each figure, Figure 1 is a perspective view of a seeder and planter embodying my invention, parts being broken away. Fig. 2 is an enlarged sectional view of the seed-hopper, reciprocating slide, distributing-chute, and portions of adjacent connections. Fig. 3 is a sectional view of the rotary followers journaled to a common hanger-beam. Fig. 4 is a detail view of a bell-crank lever employed to move the reciprocating slide forwardly.

In the drawings, A is the plow-beam, provided with handles B B', and having depending therefrom hanger-beam c, carrying a plowshare, C, of suitable construction.

D is a seed-hopper provided with a sliding cover, $d$, supported upon the beam A, the forward and rear sides, $d'$ $d^2$, of which are slotted at their lower ends for the passage therethrough of the reciprocating slide D'. Said slide is provided with an aperture for the reception of seed, while said aperture is within the hopper in the position shown in Fig. 2. Forward of the aperture $d^3$ the surface of the slide has a recess, $d^4$, into which is seated a short leaf-spring tongue, $d^5$, the free end of which is turned downward within the aperture $d^3$. The rear end of the slide has uprising shoulder $d^6$, which serves as a limiting-stop for the slide as it is projected forwardly by the actuation of a lever, W, as presently described. When the slide is moved horizontally rearwardly, the aperture $d^3$ will be outward of the hopper and will be in coincidence with the upper open end of a discharge-chute, E, and the seed, carried along by means of the spring-tongue $d^5$, will drop downwardly through said chute. Said chute E is in the form of an open-ended tube, the upper end of which is permanently adjusted within an aperture of the beam A rearward of the hopper D. From thence it inclines forwardly toward the hanger $c$, and its lower end is secured to said hanger, whereby it is maintained firmly in an oblique position, as shown in Figs. 1 and 2. It will be understood that no seed can pass from the hopper into said chute until the opening $d^3$ is brought into coincidence with the upper open end of the chute. The forward side, $d'$, of the hopper is provided with the leaf-spring S, the lower end of which presses against the forward end of the slide D' and leaves it ejected rearwardly when released by the lever W, thereby bringing the aperture $d^3$ in alignment with the upper open end of the chute E.

L is a lever-arm apertured about midway of its length, said aperture passing loosely over a pin, $b'$, extending upwardly from a short post, $b$, uprising from one of the handles. The post $b$ is cut away about midway of its length around the pin $b'$, thereby forming a shoulder inclining obliquely to the rear. Said shoulder thus composes a cam-faced fulcrum, (see detail, Fig. 1,) upon which the lever L is lifted and depressed, for a purpose presently described. Pivoted to the forward end of the lever L is a hasp, H, which is looped over the handle B, one end of said hasp being provided with a hook, $h$, that takes onto a curve at the free end of a bell-crank lever, W.

The bell-crank lever W has its lower turn, $w$, passed through the rear end of the plow-beam within a transverse bore made for its reception. From thence it is returned upwardly at either side, and one side is returned horizontally to form a bend, $w'$, in alignment with the turn $w$. Said bend $w'$ rests against the rear shoulder of the slide D'. The opposite upturned side of the lever is curved downwardly at 1, and within said curve rests the free end of the horizontal return $w'$.

From the curve 1 it is again curved upwardly at 2 and again curved downwardly at 3. Said curve 3 meshes with the hook $h$ of the hasp H, pivotally connected to the lever L, as before described.

G is a hanger-beam, which passes within a mortise at the rear end of the beam A, and is secured therein by a pin or bolt, $g$, in a vertical position. At the lower end of the hanger and mounted upon a common axle, 4, journaled within bearings of said hanger, are two rotatable follower-wheels, G'. Each of said wheels is beveled on its inner side, forming faces 5, inclining inwardly in the direction from periphery to hub, the purpose being that as said wheels turn with the progression of the device they shall not only cover the distributed seed, but also "hill up" the furrow, which function will be appreciated by all familiar with analogous devices.

From the foregoing description, in connection with the drawings, the nature and object of my invention will be readily understood by all who are familiar with analogous devices.

Its operation is as follows: The machine is drawn forwardly in the usual manner and a furrow is cut by the plowshare. When it is desired to drop seed, the operator depresses the lever L, thereby, through the bell-crank lever W, projecting the reciprocating slide forwardly, and said slide will pass within the slotted ways at the lower ends of the hopper sides. The aperture of the slide is thus brought within the hopper D, and a supply of seed will be deposited within said aperture. The lever L is then released from downward pressure, whereby the leaf-spring S will at once return the slide rearwardly, bringing the aperture directly over the upper opening of the chute E, and the seed will drop therethrough into the furrow made by the plowshare C, which is in direct alignment with the chute on the beam A. As the device is progressing, the follower-wheels will turn on their axle, and the effect will be that the soil of the field will be turned over the seed and hilled up into a surface-line in the shape of an inverted V. It will be observed that the lever must be depressed in order to gather a supply of seed. As soon as it is released from pressure, the leaf-spring S will return the slide rearwardly into its normal position and bring its aperture directly over the upper open end of the chute E. (See Fig. 2.) It will thus be seen that the operator can distribute seed at given points intermittently. In some places it may be necessary to pass over a space without making any deposit. In some instances it may be desired to drop seed in regular succession at predetermined distances. All this can be done at the will of the operator.

I have confined the description of my device to the utilization of my invention for the dropping of seed, but do not desire to be understood as limiting myself to such application. As a guano-distributer, or for other fertilizers, it has peculiar merits, as it will enable the operator to deposit quantities at given points along the route. My device will also be found to be specially serviceable as a poison-distributer on cotton-fields and other places infested with worms and insects, which are in some places more numerous than in others, in which case it is not necessary to deposit on every spot uniform quantities of insect-destroying compounds, and I will observe that such compounds are sometimes liquefied, for which purpose my device can be used as well as for dry material.

Having thus described my invention, what I claim, and desire to secure by Letters Patent, is—

1. In a device for distributing seed and other material, provided with a hopper attached upwardly upon a draft-beam, the lever-arm L, pivotally resting upon the pin $b'$ of an obliquely-faced post, $b$, uprising from one of the handles of the machine, said lever having pivoted thereto a hasp, H, meshing with a bell-crank lever, W, adjusted to impinge against an outward shoulder of a horizontally-reciprocating slide, whereby the aperture of said slide will be projected into and maintained within the hopper until released from pressure of said lever, as and for the purpose indicated, substantially as described.

2. In a seed-planter having a hopper provided with opposite apertures for passage of an orificed reciprocating slide, the combination therewith of the following elements: the bell-crank lever W, linked to the lever L, adjusted to swing upon the pin $b'$ of an obliquely-faced post, $b$, uprising from a handle of the device, obliquely-inclined chute E, and follower-wheels G', having their inner faces obliquely inclined from periphery to hub, said coverers being journaled at the lower end of the common beam in alignment with a forward plowshare, as and for the purpose indicated, substantially as described.

JAK. MITCHELL.

Witnesses:
J. F. JONES,
A. M. TRUMAN.